March 29, 1966 J. J. SMITH 3,242,594
VINYL ART
Filed Oct. 28, 1963
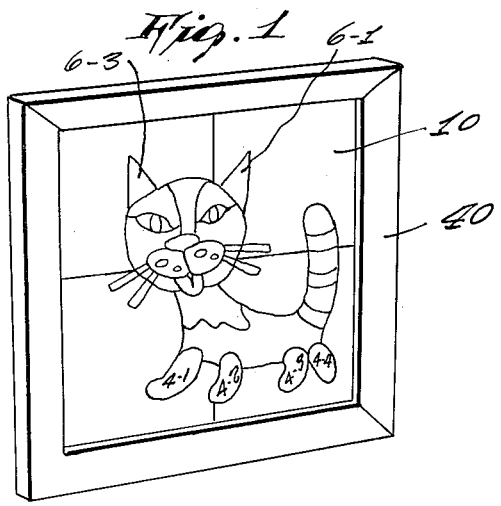
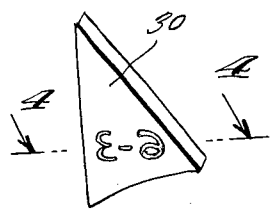
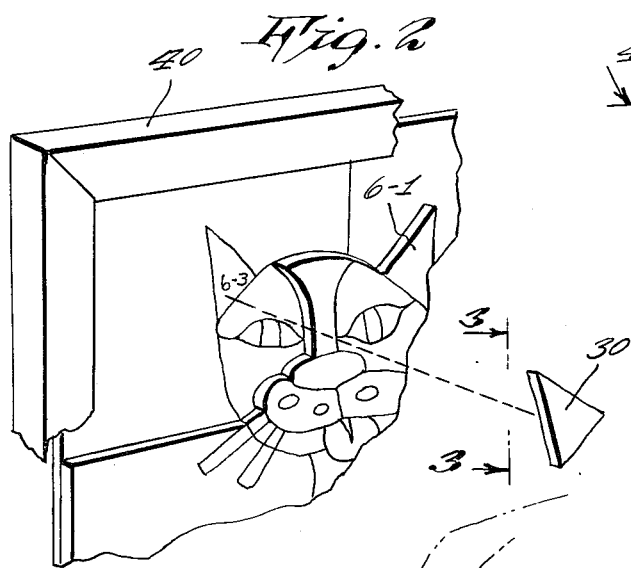
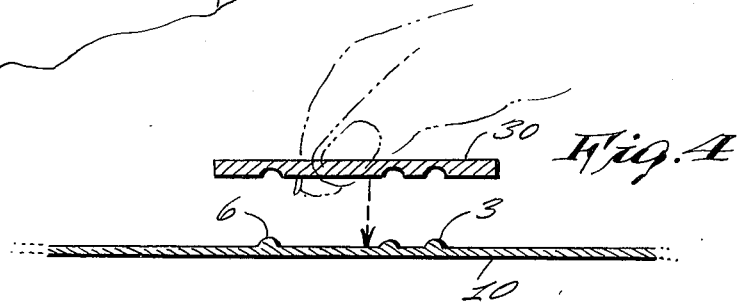
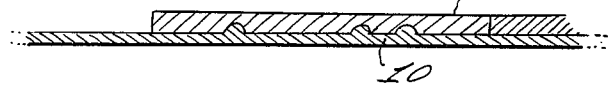
INVENTOR.
JAMES J. SMITH

3,242,594
VINYL ART
James J. Smith, 575 80th St., Brooklyn, N.Y.
Filed Oct. 28, 1963, Ser. No. 319,430
1 Claim. (Cl. 35—26)

My invention is directed toward picture reproducing devices using pieces of vinyl tile of different colors, shapes and sizes, as picture elements.

It is an object of my invention to provide means for reproducing any type of picture such as flowers, birds, boats, and the like, in color, by assembling together various pieces of vinyl tile of differing shapes and sizes, individual pieces being uniformly colored in selected single colors, individual pieces differing in color.

Another object of my invention is to provide a new method for producing pictures using vinyl tile as described above.

Still another object of my invention is to provide new and improved devices and methods of the character indicated.

All of the foregoing and still further objects and advantages of my invention will now be explained with reference both to this specification and to the drawings wherein:

FIGURE 1 illustrates a picture of a cat which is to be reproduced in color in accordance with my invention;

FIGURE 2 illustrates the reproduced picture in partially completed form;

FIGURE 3 is a view taken along 3—3 in FIGURE 2;

FIGURE 4 is a view taken along 4—4 in FIGURE 3; and

FIGURE 5 is a cross-sectional view of a portion of the reproduced picture.

In order to use my process, a picture in color is selected for reproduction. This picture is divided, for example, by drawing lines thereon, into a plurality of adjacent areas in such manner that each area is in a solid and uniform single color. These areas can have different sizes and shapes and can differ in color one from another. A like plurality of pieces of vinyl tile in various single colors are then cut into patterns in such manner that, for each individual area, there is a corresponding piece of tile having the same size and shape and color. These various pieces are then secured to a supporting surface in such relationship as to be a reconstruction or reproduction of the original picture.

To aid in this, each area is coded or otherwise identified with separate indicia, and each corresponding piece of tile is likewise coded or identified.

FIGURES 1–5 show the invention in detail. A supporting surface 10 such as a hard rubber sheet, is shown bearing a picture of a cat which is divided into a plurality of adjacent areas. Areas of the same color but differing in location are given separate numbers, all of which start with the same digit. Thus the two ears of the cat are identified as 6–1 and 6–3. The four feet are identified as 4–1, 4–2, 4–3 and 4–4.

For ease of reproduction, each area carries its assigned number in raised form on the supporting surface. A like plurality of pieces of tile are prepared as previously described, each piece carrying the appropriate number impressed as an indentation on one side of the piece. For example, piece 30, which corresponds to the ear area 6–3, carries as an indentation the mirror image of 6–3.

The pieces are assembled together by placing each tile in turn upon surface 10 in such manner that the impressed mirror image engages and is held in position by the raised number of the corresponding area.

When the various pieces have been secured to surface 10 with an adhesive, a moulding or frame 40 can be secured to the periphery of this surface to complete the reproduction.

The invention, as described hereinabove, can be used for making pictures which can be hung on a wall, for over-sized pictures to be used as a mural, for inlays on floors, to cover tables such as used in the dining room, kitchen, coffee tables, etc., the tops of bars, or any other environment for decorative purposes. The method can also be used with Eldorado designs, Coronado, Renaissance, or imitation marble designs, or Flair or Terrazzo designs, etc. The pictures or decorations formed by practicing this invention, will be impervious to grease and spilled acids, and therefore can be substantially permanent in nature. They can be washed, waxed, etc. and are much more durable than ordinary picture paintings and the like.

While I have described my invention with particular reference to the drawings, my protection is to be limited only by the terms of the claim which follows.

I claim:

A picture reproducing device comprising a hard rubber sheet having a plurality of adjacent areas on one surface thereof, each area carrying a different raised number, a like plurality of pieces of tile differing in shape, size and color, each piece carrying on one surface thereof a different recessed number corresponding to the raised number of the corresponding area, each piece resting on said one sheet surface with its recessed number in registration with the corresponding raised number whereby said pieces together compose a picture.

References Cited by the Examiner

UNITED STATES PATENTS

| 1,063,472 | 6/1913 | Schultze | 35—26 X |
| 1,480,458 | 1/1924 | Mershon | 35—28 X |
| 2,415,342 | 2/1947 | Donner | 35—69 |
| 3,151,867 | 10/1964 | Miller | 273—157 |

FOREIGN PATENTS

| 1,327,012 | 4/1963 | France. |
| 690,686 | 4/1953 | Great Britain. |

EUGENE R. CAPOZIO, *Primary Examiner.*

JEROME SCHNALL, *Examiner.*

HARLAND S. SKOGQUIST, *Assistant Examiner.*